United States Patent
Ogawa et al.

(10) Patent No.: US 9,758,038 B2
(45) Date of Patent: Sep. 12, 2017

(54) CLUTCH CONTROL DEVICE FOR FOUR-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/117,950

(22) PCT Filed: Feb. 24, 2015

(86) PCT No.: PCT/JP2015/055253
§ 371 (c)(1),
(2) Date: Aug. 10, 2016

(87) PCT Pub. No.: WO2015/129697
PCT Pub. Date: Sep. 3, 2015

(65) Prior Publication Data
US 2016/0347171 A1    Dec. 1, 2016

(30) Foreign Application Priority Data

Feb. 27, 2014  (JP) .................................. 2014-036447

(51) Int. Cl.
*B60W 10/02*  (2006.01)
*B60W 10/04*  (2006.01)
(Continued)

(52) U.S. Cl.
CPC ............ *B60K 23/08* (2013.01); *B60K 17/344* (2013.01); *B60K 23/0808* (2013.01);
(Continued)

(58) Field of Classification Search
None
See application file for complete search history.

(56) References Cited

U.S. PATENT DOCUMENTS

2009/0076696 A1* 3/2009 Perkins .................. B60K 23/08
701/69
2011/0275470 A1* 11/2011 Ekonen .................. B60K 17/35
475/198

(Continued)

FOREIGN PATENT DOCUMENTS

EP    0 911 205 A2    4/1999
JP    62-43355 A    2/1987
(Continued)

*Primary Examiner* — Edwin A Young
(74) *Attorney, Agent, or Firm* — Global IP Counselors, LLP

(57) ABSTRACT

A clutch control device is provided for a four-wheel drive vehicle for transmitting drive force to the rear wheels. The clutch control device includes a dog clutch and a friction clutch, and a controller that controls the engagement and disengagement of the dog clutch and the friction clutch. In this clutch control device, the four-wheel drive hybrid vehicle includes a disconnected, two-wheel drive mode and a connected, four-wheel drive mode. When a driver's foot is lifted off an accelerator in a low-speed region when the connected, four-wheel drive mode is selected, the 4WD control unit maintains the connected, four-wheel drive mode while the brakes are not depressed, and shifts the mode to the disconnected, two-wheel drive mode when the brakes are depressed.

15 Claims, 6 Drawing Sheets

(51) Int. Cl.

| | |
|---|---|
| *B60W 10/18* | (2012.01) |
| *B60K 23/08* | (2006.01) |
| *B60W 40/114* | (2012.01) |
| *B60W 10/16* | (2012.01) |
| *B60W 30/02* | (2012.01) |
| *B60W 30/045* | (2012.01) |
| *B60W 40/101* | (2012.01) |
| *B60K 17/344* | (2006.01) |
| *F16D 11/00* | (2006.01) |
| *F16D 13/00* | (2006.01) |
| *F16D 21/00* | (2006.01) |
| *F16D 23/04* | (2006.01) |
| *F16D 48/06* | (2006.01) |
| *B60K 17/35* | (2006.01) |

(52) U.S. Cl.
CPC ............ *B60W 10/02* (2013.01); *B60W 10/04* (2013.01); *B60W 10/16* (2013.01); *B60W 30/02* (2013.01); *B60W 30/045* (2013.01); *B60W 40/101* (2013.01); *B60W 40/114* (2013.01); *F16D 11/00* (2013.01); *F16D 13/00* (2013.01); *F16D 21/00* (2013.01); *F16D 23/04* (2013.01); *F16D 48/06* (2013.01); *B60K 17/3515* (2013.01); *B60K 2023/085* (2013.01)

(56) References Cited

U.S. PATENT DOCUMENTS

2014/0018208 A1\* 1/2014 Takaishi ................. B60K 23/00
477/36
2014/0051541 A1 2/2014 Osborn et al.

FOREIGN PATENT DOCUMENTS

| JP | 2000-43696 A | 2/2000 |
| JP | 2010-254058 A | 11/2010 |
| JP | 2012-61923 A | 3/2012 |
| WO | 2013/093978 A1 | 6/2013 |

\* cited by examiner

CLUTCH CONTROL DEVICE FOR FOUR-WHEEL DRIVE VEHICLE

CROSS-REFERENCE TO RELATED APPLICATIONS

This application is a U.S. National stage application of International Application No. PCT/JP2015/055253, filed Feb. 24, 2015, which claims priority to JP Patent Application No. 2014-036447 filed on Feb. 27, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In the four-wheel drive vehicle, when switching from a two-wheel drive mode to a four-wheel drive mode, the dog clutch is engaged after the friction clutch is engaged. In addition, when switching from a four-wheel drive mode to a two-wheel drive mode, the dog clutch is released after the friction clutch is released.

SUMMARY

However, in a conventional device, it is not specified in what type of vehicle state the two-wheel drive mode and the four-wheel drive mode are selected. Consequently, if the four-wheel drive mode is selected in preparation for re-acceleration when the foot is lifted off an accelerator in a low-speed region, a four-wheel drive mode is maintained even if the brakes are depressed. Therefore, there is the problem that the friction of the drive transmission system is increased.

In view of the problems described above, an object of the present invention is to provide a clutch control device for a four-wheel drive vehicle capable of achieving a balance between securing four-wheel drive performance during re-acceleration and reducing friction in a drive transmission system during braking when the foot is lifted off an accelerator in a low-speed region when a connected, four-wheel drive mode has been selected.

In order to achieve the object above, in the present invention, of the left and right front wheels and the left and right rear wheels, one pair is set as main drive wheels which are connected to a drive source and the other pair is set as auxiliary drive wheels which are connected to the drive source via a clutch. Provided as the clutches are a dog clutch and a friction clutch, disposed in a transmission system path on the drive branch-side across the differential, and in a transmission system path on the auxiliary drive wheel-side, respectively, of a system for transmitting drive force to the auxiliary drive wheels. The dog clutch separates the system for transmitting drive force to the auxiliary drive wheels from the system for transmitting drive force to the main drive wheels by releasing the clutch, and the friction clutch allocates a portion of the drive force from the drive source to the auxiliary drive wheels in accordance with the clutch engagement capacity. In this four-wheel drive vehicle, a clutch control means is provided, which carries out an engagement and disengagement control of the dog clutch and an engagement and disengagement control of the friction clutch. The four-wheel drive vehicle comprises a disconnected, two-wheel drive mode in which the dog clutch and the friction clutch are disengaged, and a connected, four-wheel drive mode in which the dog clutch and the friction clutch are engaged. When the foot is lifted off an accelerator in a low-speed region when the connected, four-wheel drive mode is selected, the clutch control means maintains the connected, four-wheel drive mode while the brakes are not depressed, and shifts to the disconnected, two-wheel drive mode when the brakes are depressed.

Thus, when the foot is lifted off the accelerator in a low-speed region when the connected, four-wheel drive mode is selected, the connected, four-wheel drive mode is maintained while the brakes are not depressed, and the mode is shifted to the disconnected, two-wheel drive mode when the brakes are depressed. Therefore, the "connected, four-wheel drive mode" is a high drive performance four-wheel drive mode that allocates the drive force from the drive source to the four wheels at the time of an acceleration request, and the like. The "disconnected, two-wheel drive mode" is a two-wheel drive mode that suppresses friction loss, and the like, by stopping the rotation of the system for transmitting drive force to the auxiliary drive wheels from the dog clutch to the friction clutch. In contrast, it was recognized that when the foot is lifted off the accelerator and the brakes are not operated, it is necessary to prepare for re-acceleration by a depression of the accelerator immediately thereafter, but when the brakes are operated, there is little need to prepare for re-acceleration. Therefore, since the "connected, four-wheel drive mode" is maintained if the brakes are not depressed, the acceleration requirement can be met during re-acceleration when shifting from when the foot is lifted off the accelerator to an accelerator depression operation, thereby securing four-wheel drive performance. On the other hand, since the mode is switched to the "disconnected, two-wheel drive mode" when the brakes are depressed, friction in a drive transmission system is reduced during braking. As a result, it is possible to achieve a balance between securing four-wheel drive performance during re-acceleration and reducing friction in a drive transmission system during braking when the foot is lifted off the accelerator in a low-speed region when a connected, four-wheel drive mode has been selected.

DETAILED DESCRIPTION OF THE EMBODIMENTS

Figure 1:
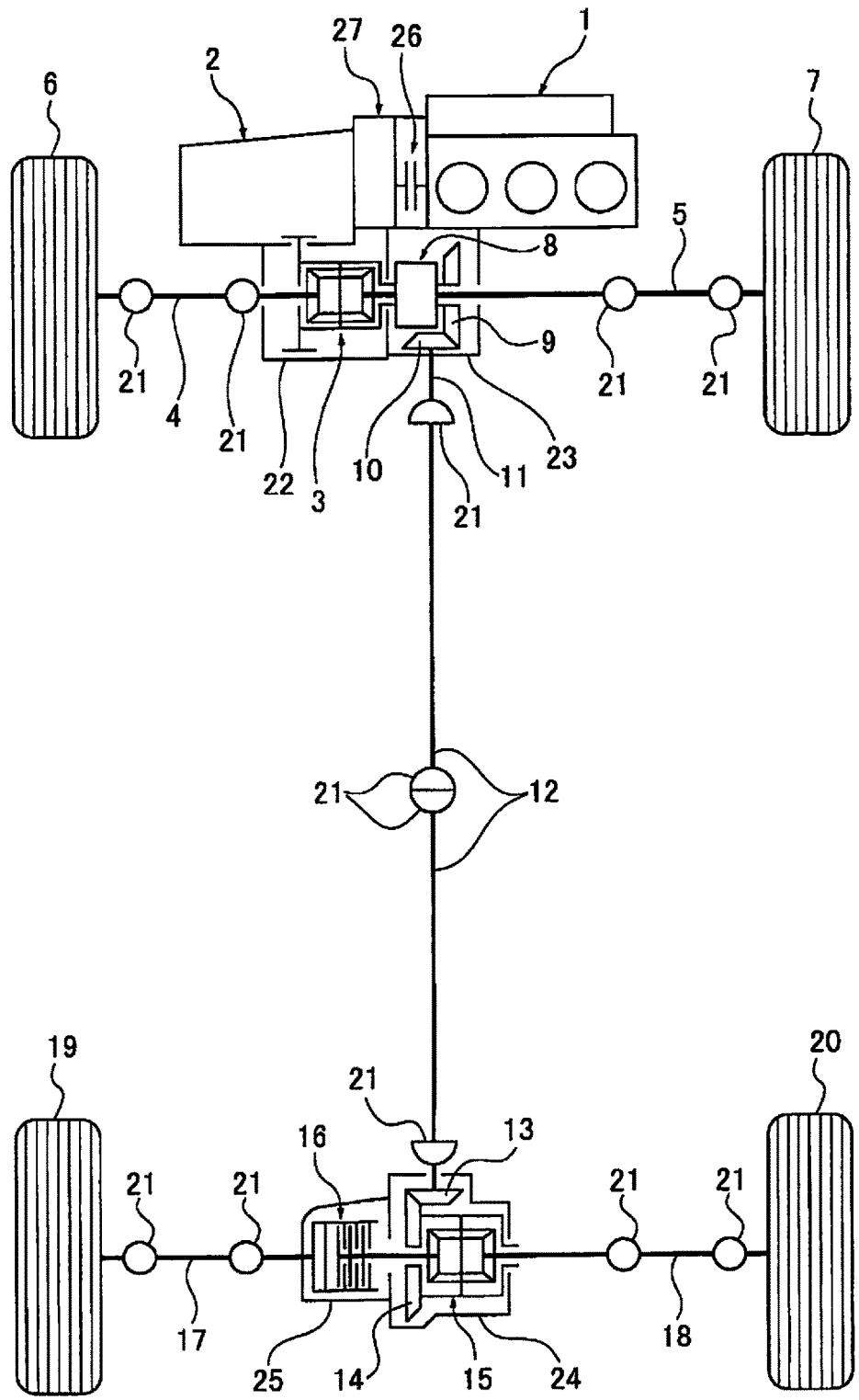
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below based on the first embodiment and the second embodiment illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment. The overall configuration of the clutch control device for a drive system configuration of four-wheel drive vehicle will be described first.

Drive System Configuration of the Four-Wheel Drive Hybrid Vehicle

FIG. 1 illustrates the configuration of the drive system of a four-wheel drive hybrid vehicle to which is applied the clutch control device. The drive system configuration of the four-wheel drive hybrid vehicle will be described below based on FIG. 1.

The front wheel drive system of a four-wheel drive hybrid vehicle is provided with a transverse engine 1 (drive source), an engine clutch 26, a motor/generator 27 (drive source), and a transmission 2, as illustrated in FIG. 1. A front differential 3, a left front wheel drive shaft 4, a right front wheel drive shaft 5, a left front wheel 6 (main drive wheel), and a right front wheel 7 (main drive wheel) are provided on the downstream side of the transmission 2. That is, it is possible to switch between a hybrid vehicle mode by an engagement of the engine clutch 26 (hereinafter referred to as "HEV mode") and an electric vehicle mode by a disengagement of the engine clutch 26 (hereinafter referred to as "EV mode"). The "HEV mode" is selected in a high accelerator position opening amount region and the "EV mode" is selected in a low accelerator position opening amount region. For example, during powering of the motor/generator 27 in "EV mode," the drive force that is transmitted from the motor/generator 27 and the transmission 2 to the left and right front wheel drive shafts 4, 5 via the front differential 3, and constantly drives the left and right front wheels 6 and 7 while allowing a differential rotation. In addition, during regeneration of the motor/generator 27 in "EV mode," the drive energy from the left and right front wheels 6 and 7 is input to the motor/generator 27 via the left and right drive shafts 4, 5, the front differential 3, and the transmission 2.

Figure 2:
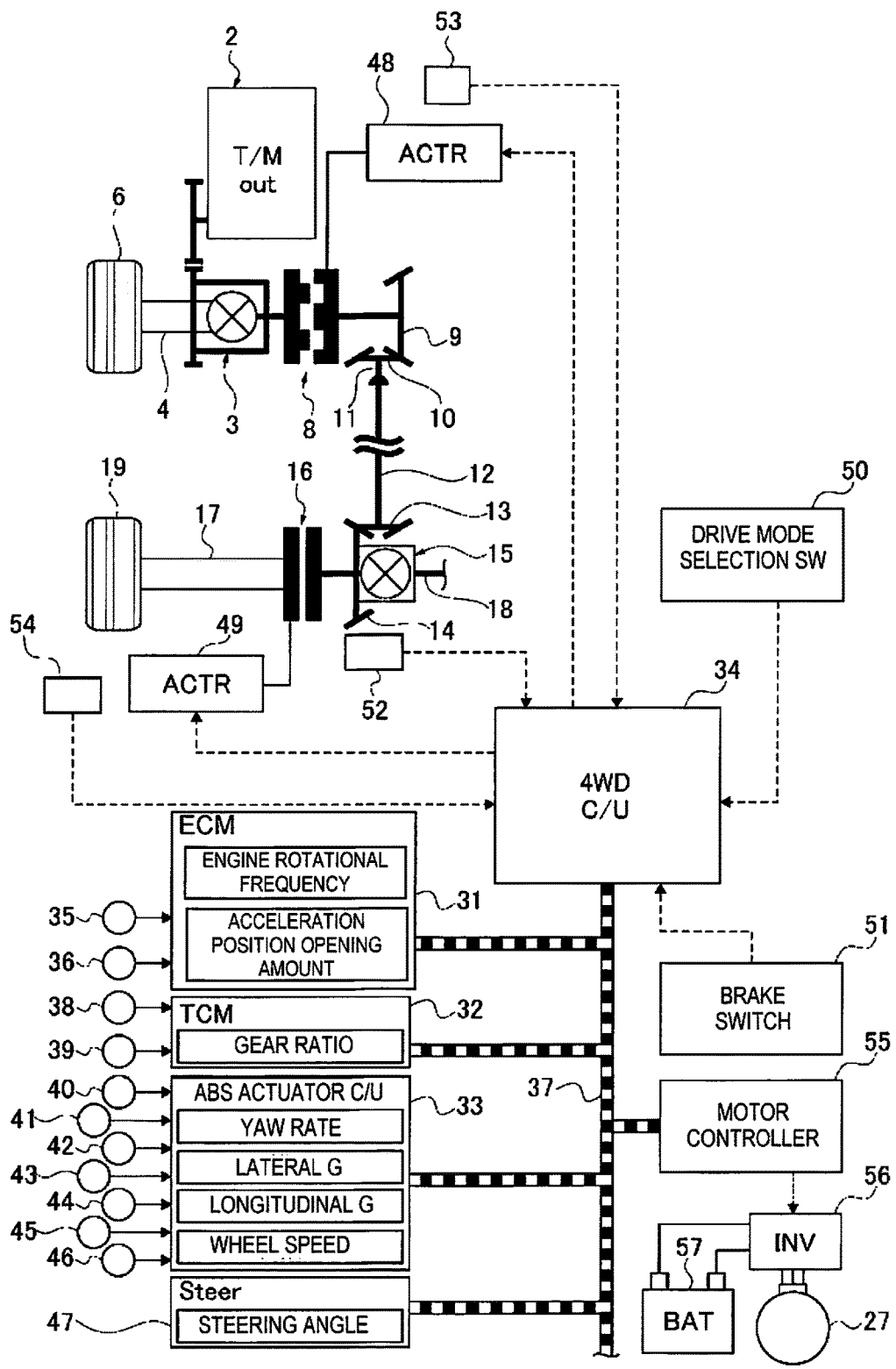
FIG. 2 is a block view of the control system illustrating the configuration of the control system of the front wheel drive based four-wheel drive vehicle to which is applied the clutch control device of the first embodiment.

The drive energy is then converted into electrical energy by the motor/generator 27 to charge the battery 57 (refer to FIG. 2).

The rear wheel drive system of the four-wheel drive hybrid vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided. That is, the drive system is configured to be capable of selecting a two-wheel drive mode (i.e., disconnected, two-wheel drive mode) in which both the dog clutch 8 and the electronically controlled coupling 16 are disengaged. The rotation of the drive system (rotation of the propeller shaft 12, etc.) on the downstream side of the dog clutch 8 is stopped by releasing this dog clutch 8 and electronically controlled coupling 16. The suppression of friction loss and oil stirring loss to achieve improved fuel efficiency is thereby possible.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The input side meshing member of the dog clutch 8 is connected to the differential case of the front differential 3, and the output side meshing member of the dog clutch 8 is connected to the bevel gear 9. The dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members is a fixing member and the other is a movable member, in which a spring that biases in the engaging direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, and the teeth of the two are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. An input side clutch plate of the electronically controlled coupling 16 is connected to a left side gear of the rear differential 15, and an output side clutch plate is connected to a left rear wheel drive shaft 17. This electronically controlled coupling 16 is incorporated in a coupling case 25 that is fixed in a position adjacent to a rear differential housing 24. For example, an electronically controlled coupling comprising a multi-plate friction clutch in which a plurality of input-side and output-side plates are alternately arranged, a fixed cam piston and a movable cam piston which have opposing cam surfaces, and a cam member that is interposed between the opposing cam surfaces, is used as this electronically controlled coupling 16. The engagement of the electronically controlled coupling 16 is carried out by the movable cam piston being moved in the clutch engaging direction in accordance with the rotation angle to increase the frictional engagement force of the multi-plate friction clutch, due to a cam action that expands the piston gap that is generated by an electric motor rotating the movable cam piston. The release of the electronically controlled coupling 16 is carried out by the movable cam piston being moved in the clutch releasing direction in accordance with the rotation angle to decrease the frictional engagement force of the multi-plate friction clutch, due to a cam action that reduces the piston gap that is generated by the electric motor rotating the movable cam piston in the opposite direction of the engaging direction.

Control System Configuration of the Four-Wheel Drive Hybrid Vehicle

FIG. 2 illustrates the configuration of the control system of the four-wheel drive hybrid vehicle to which is applied the clutch control device. The control system configuration of the four-wheel drive hybrid vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2.

The engine control module 31 is a control device of the transverse engine 1, which inputs detection signals from an engine rotational frequency sensor 35, an accelerator position opening amount sensor 36, and the like. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like. Gear ratio information (gear ratio information) is input from this transmission control module 32 to the 4WD control unit 34 via the CAN communication line 37.

The ABS actuator control unit 33 is a control device of an ABS actuator which controls the brake fluid pressure of each wheel, which inputs detection signals from a yaw rate sensor 40, a lateral G sensor 41, a longitudinal G sensor 42, and wheel speed sensors 43, 44, 45, 46, and the like. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37. The average value of the left and right rear wheel speed information will be the vehicle speed information (VSP information).

The 4WD control unit 34 is a control device that controls the engagement and disengagement of the dog clutch 8 and the electronically controlled coupling 16, and carries out a calculation step based on various input information. The control unit outputs drive control commands to a dog clutch actuator 48 (solenoid) and an electronically controlled coupling actuator 49 (electric motor). Here, a drive mode selection switch 50, a brake switch 51 that detects the presence/absence of a brake operation, a ring gear rotational frequency sensor 52, a dog clutch stroke sensor 53, a motor rotation angle sensor 54, and the like are provided as input information sources from other than the CAN communication line 37.

The drive mode selection switch 50 is a switch with which a driver switches to select among a "2WD mode," a "lock mode," and an "auto mode." When the "2WD mode" is selected, a front wheel drive 2WD state, in which the dog clutch 8 and the electronically controlled coupling 16 are released, is maintained. When the "lock mode" is selected, a full 4WD state in which the dog clutch 8 and the electronically controlled coupling 16 are engaged is maintained. Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC). Here, in "auto mode," there is a choice between an "eco-auto mode" and a "sports auto mode," where the release state of the electronically controlled coupling 16 in "standby two-wheel drive mode," in which the dog clutch 8 is engaged, will differ and depends upon the selected mode. That is, when "eco-auto mode" is selected, the electronically controlled coupling 16 is placed in a fully released state and waits, and when "sports auto mode" is selected, the electronically controlled coupling 16 is placed in a released state immediately before engagement and waits.

The ring gear rotational frequency sensor 52 is a sensor for acquiring output rotational speed information of the dog clutch 8, and which calculates the output side rotational frequency of the dog clutch 8 by taking into consideration the rear side gear ratio and the front side gear ratio upon calculation with respect to the detected value of the ring gear rotational frequency. The input rotational speed information of the dog clutch 8 is obtained by calculating the average values of the left front wheel speed from the left front wheel speed sensor 43 and the right front wheel speed from the right front wheel speed sensor 44.

A motor controller 55 that controls the motor/generator 27 is connected to the CAN communication line 37. The direct current from the battery 57 is converted into three-phase alternating current by an inverter 56 according to a powering command from this motor controller 55 and output to the motor/generator 27, and three-phase alternating current generated by the motor/generator 27 is converted into direct current for charging the battery 57 according to a regeneration command. A regeneration command to the inverter 56 is output when carrying out regenerative cooperation control, in which a requested braking force during a braking operation is allotted to a regenerative braking portion (priority) and a hydraulic braking portion.

Drive Mode Switching Configuration

Figure 3:
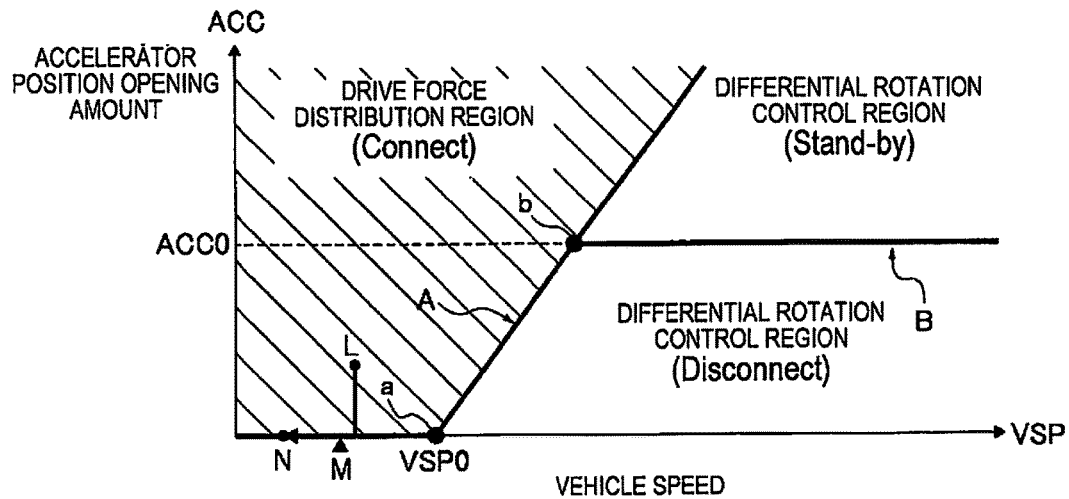
FIG. 3 is a basic map view illustrating a drive mode switching map corresponding to the vehicle speed and the accelerator position opening amount used in the clutch control, when the "auto mode" of the first embodiment is selected.
Figure 4:
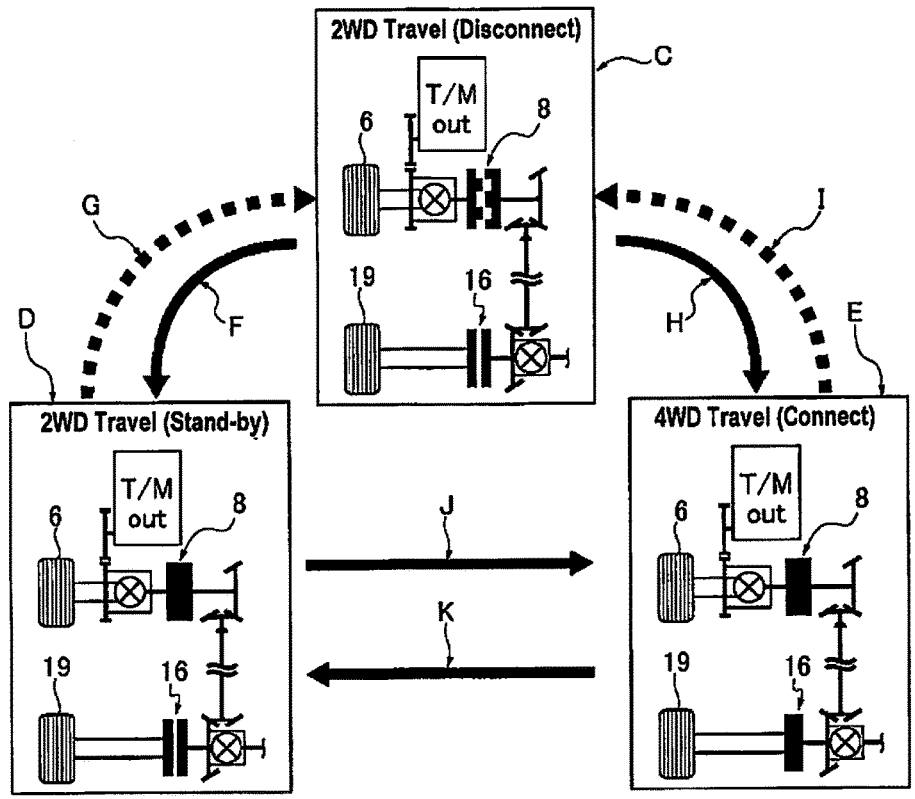
FIG. 4 is a drive mode transition view illustrating the switching transition of the drive mode (disconnected, two-wheel drive mode/standby two-wheel drive mode/connected, four-wheel drive mode) by the clutch control, when the "auto mode" of the first embodiment is selected.

FIG. 3 illustrates a drive mode switching map corresponding to the vehicle speed VSP and the accelerator position opening amount ACC used in the clutch control when the "auto mode" is selected, and FIG. 4 illustrates the switching transition of the drive mode (disconnected, two-wheel drive mode/standby two-wheel drive mode/connected, four-wheel drive mode). The drive mode switching configuration will be described below, based on FIGS. 3 and 4.

The drive mode switching map is set to be separated into the disconnected, two-wheel drive mode (Disconnect), the standby two-wheel drive mode (Standby), and the connected, four-wheel drive mode (Connect), in accordance with the vehicle speed VSP and the accelerator position opening amount ACC, as illustrated in FIG. 3. These three drive modes are separated by a region dividing line A in which the accelerator position opening amount ACC is increased proportionally with the increase in the vehicle speed VSP from a base point a of a set vehicle speed VSPO at which the accelerator position opening amount is zero, and a region dividing line B of a constant accelerator position opening amount ACC0, which is drawn from an intersection b with the region dividing line A toward the high vehicle speed side.

The disconnected, two-wheel drive mode (Disconnect) is set in the region in which the accelerator position opening amount ACC is less than or equal to the set accelerator position opening amount ACC0, and which is surrounded by the vehicle speed axis line on which the accelerator position opening amount ACC is zero, the region dividing line A, and the region dividing line B. That is, the mode is set in a region in which the frequency of occurrence of the differential rotation of the left and right front wheels 6 and 7 and the left and right rear wheels 19 and 20 due to wheel slip is extremely low, since the accelerator position opening amount ACC is less than or equal to the set accelerator position opening amount ACC0; and even if wheel slip does occur, the four-wheel drive requirement is low, so that slip increases slowly.

The standby two-wheel drive mode (Standby) is set in a high vehicle speed region in which the accelerator position opening amount ACC exceeds the set accelerator position opening amount ACC0, and which is defined by the region dividing line A and the region dividing line B. That is, the mode is set in a region in which, since the accelerator position opening amount ACC exceeds the set accelerator position opening amount ACC0, while the 4WD requirement is low because the vehicle speed VSP is in a high vehicle speed region, if differential rotation of the left and right front wheels 6 and 7 and the left and right rear wheels 19 and 20 is generated due to wheel slip, there is a high probability that slip will increase rapidly.

The connected, four-wheel drive mode (Connect) is set in the region surrounded by the accelerator position opening amount axis line on which the vehicle speed VSP is zero, the vehicle speed axis line on which the accelerator position opening amount ACC is zero, and the region dividing line A. That is, the mode is set in a region in which the 4WD requirement is high, such as when starting or upon high-load travel in which the vehicle speed VSP is low but the accelerator position opening amount ACC is high.

When the disconnected, two-wheel drive mode (Disconnect) is selected, the travel mode becomes 2WD travel (Disconnect) in which both the dog clutch 8 and the electronically controlled coupling 16 are released, as illustrated in frame C of FIG. 4. Basically, in this disconnected, two-wheel drive mode, front wheel drive 2WD travel (Disconnect), in which drive force is transmitted only to the left and right front wheels 6 and 7, is maintained. However, if the left and right front wheels 6 and 7 slip during front wheel drive 2WD travel and the wheel slip amount (i.e., amount of differential rotation between the front and rear wheels) exceeds a threshold value, the electronically controlled coupling 16 is frictionally engaged. Thereafter, if a rotationally synchronized state is determined, differential rotation control of the front and rear wheels to suppress wheel slip is carried out by engaging the dog clutch 8 and allocating drive force to the left and right rear wheels 19 and 20.

When the standby two-wheel drive mode (Standby) is selected, the travel mode becomes 2WD travel (Standby) in which the dog clutch 8 is engaged and the electronically controlled coupling 16 is released, as illustrated in frame D of FIG. 4. Basically, in this standby two-wheel drive mode, front wheel drive 2WD travel (Standby), in which drive force is transmitted only to the left and right front wheels 6 and 7, is maintained. However, the left and right front wheels 6 and 7 slip during front wheel drive 2WD travel and the wheel slip amount (i.e., amount of differential rotation between the front and rear wheels) exceeds a threshold value, only the electronically controlled coupling 16 is frictionally engaged, since the dog clutch 8 has already been engaged. Differential rotation control of the front and rear wheels to suppress wheel slip is carried out by allocating drive force to the left and right rear wheels 19 and 20 with good responsiveness by this frictional engagement of the electronically controlled coupling 16.

When the connected, four-wheel drive mode (Connect) is selected, the travel mode becomes 4WD travel (Connect) in which both the dog clutch 8 and the electronically controlled coupling 16 are engaged, as illustrated in frame E of FIG. 4. Basically, in this connected, four-wheel drive mode (Connect), a drive force distribution control is carried out, which achieves the optimum drive force distribution to the left and right front wheels 6 and 7, and to the left and right rear wheels 19 and 20 that is suited to the road conditions (for example, control at the time of start, control corresponding to the accelerator position opening amount, and control corresponding to the vehicle speed). However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce the possibility of a tight corner braking phenomenon.

The switching transition between the 2WD travel (Disconnect), 2WD travel (Standby), and 4WD travel (Connect) is carried out by a switching request of the drive mode that is output when an operating point, which is determined by the vehicle speed VSP and the accelerator position opening amount ACC, crosses the region dividing line A and the region dividing line B illustrated in FIG. 3. The switching transition speed of each drive mode is determined so that the transition speed to a drive mode that meets a 4WD request is prioritized over the transition speed to the disconnected, two-wheel drive mode that meets a fuel efficiency request. That is, the switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast and the switching transition speed of 4WD travel (Connect) →2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
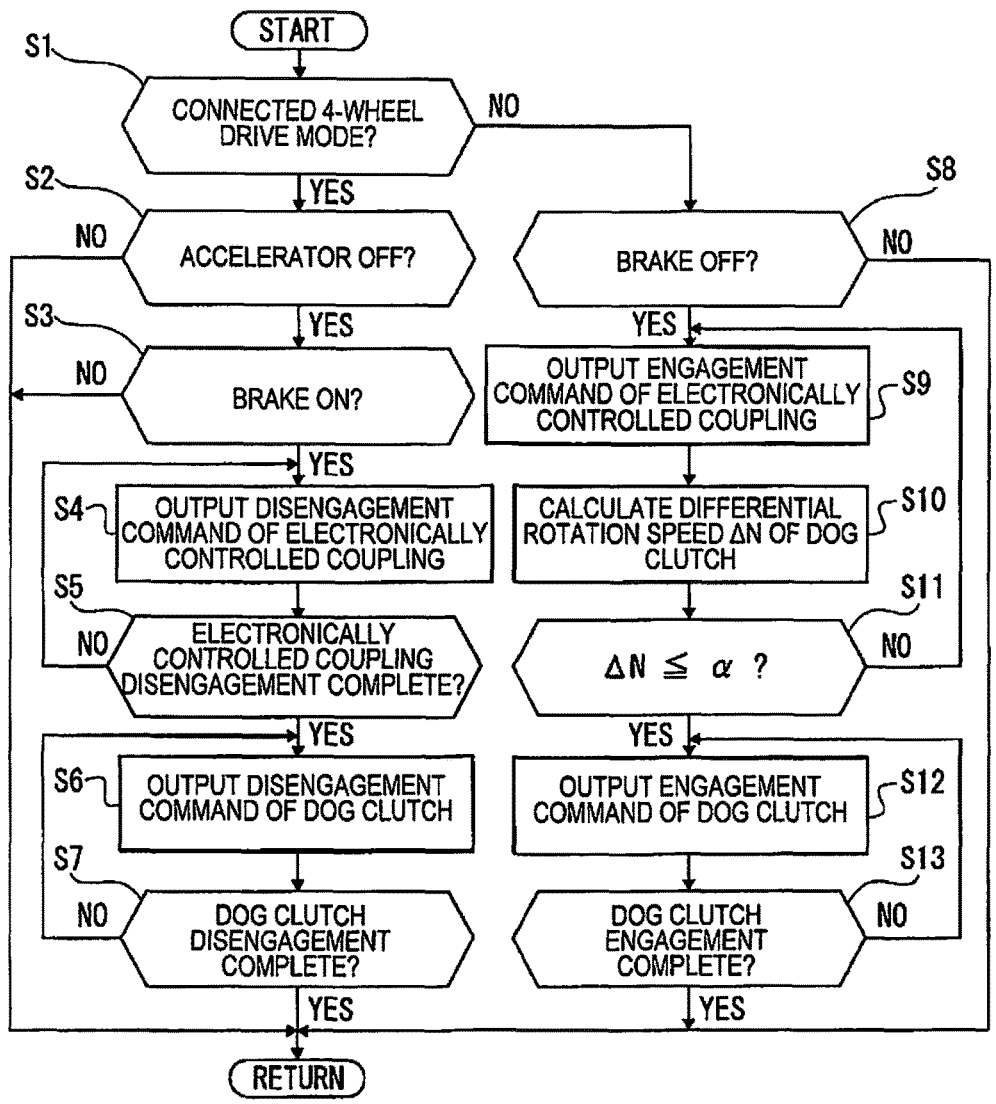
FIG. 5 is a flowchart illustrating the flow of the oil temperature control process that is executed in the 4WD control unit of the first embodiment.

FIG. 5 illustrates the flow of the clutch control process that is executed in the 4WD control unit 34 (clutch controller). Each of the steps in FIG. 5 will be described below, which represents the clutch control process configuration.

This flowchart is started when the "auto mode" is selected as well as when in a low-speed region where the "connected, four-wheel drive mode," in which both the dog clutch 8 and the electronically controlled coupling 16 are engaged, is selected, based on the drive mode switching map of FIG. 3.

In Step S1, it is determined whether or not the mode is the "connected, four-wheel drive mode." If YES (connected, four-wheel drive mode), the process proceeds to Step S2, and if NO (disconnected, two-wheel drive mode), the process proceeds to Step S8.

In Step S2, following the determination that the mode is the "connected, four-wheel drive mode" in Step S1, it is determined whether or not the foot is lifted off the accelerator. If YES (accelerator OFF), the process proceeds to Step S3, and if NO (accelerator ON), the process proceeds to RETURN. Here, whether or not the foot is lifted off the accelerator is determined by accelerator position opening amount information from the accelerator position opening amount sensor 36. In addition, when proceeding to RETURN, the "connected, four-wheel drive mode" is maintained.

In Step S3, following the determination that the accelerator is OFF in Step S2, it is determined whether or not the brakes are depressed. If YES (brake ON), the process proceeds to Step S4, and if NO (brake OFF), the process proceeds to RETURN. Here, whether or not the brakes are depressed is determined from brake switch information from the brake switch 51. If it is determined that the brakes are ON, a transition from the "connected, four-wheel drive mode" to the "disconnected, two-wheel drive mode" is determined, and a disengagement request is issued to the dog clutch 8. In addition, when proceeding to RETURN, the "connected, four-wheel drive mode" is maintained.

In Step S4, following the determination that the brakes are ON in Step S3, or, the determination that disengagement of the electronically controlled coupling 16 is incomplete in Step S5, a disengagement command is first output to the coupling actuator 49 of the electronically controlled coupling 16 based on the disengagement request to the dog clutch 8, and the process proceeds to Step S5.

In Step S5, following the output of a disengagement command of the electronically controlled coupling 16 in Step S4, it is determined whether or not the disengagement of the electronically controlled coupling 16 is complete. If YES (electronically controlled coupling disengagement complete), the process proceeds to Step S6, and if NO (electronically controlled coupling disengagement incomplete), the process returns to Step S4. Here, the completion of disengagement of the electronically controlled coupling 16 is determined by motor rotation angle information from a motor rotation angle sensor 54 reaching a disengagement completion angle for the electronically controlled coupling 16.

In Step S6, following the determination that the electronically controlled coupling disengagement is complete in Step S5, or the determination that the dog clutch disengagement is incomplete in Step S7, a disengagement command is output to the clutch actuator 48 of the dog clutch 8, and the process proceeds to Step S7.

In Step S7, following the output of a disengagement command to the dog clutch 8 in Step S6, it is determined whether or not the disengagement of the dog clutch 8 is complete. If YES (dog clutch disengagement complete), the process proceeds to RETURN, and if NO (dog clutch disengagement incomplete), the process returns to Step S6. Here, whether or not the disengagement of the dog clutch 8 is complete is carried out on the basis of stroke information from the dog clutch stroke sensor 53. In addition, if the process proceeds to RETURN, the mode is henceforth considered to be the "disconnected, two-wheel drive mode" as an exception, even though determination by the operating point in FIG. 3 is in the "connected, four-wheel drive mode" region.

In Step S8, following the determination that the mode is the "disconnected, two-wheel drive mode" in Step S1, it is determined whether or not the foot is lifted off the brake. If YES (brake OFF), the process proceeds to Step S9, and if NO (brake ON), the process proceeds to RETURN. Here, whether or not the foot is lifted off the brake is determined from brake switch information from the brake switch 51. If it is determined that the brakes are OFF, a transition from the "disconnected, two-wheel drive mode" to the "connected, four-wheel drive mode" is determined, and an engagement request is issued to the dog clutch 8. In addition, when proceeding to RETURN, the "disconnected, two-wheel drive mode" is maintained.

In Step S9, following the determination that the brakes are OFF in Step S8, or the determination that $\Delta N > \alpha$ in Step S11, an engagement command is first output to the coupling actuator 49 of the electronically controlled coupling 16 based on the engagement request to the dog clutch 8, and the process proceeds to Step S10. Here, the engagement command to the coupling actuator 49 will be a high-gradient command with which the electronically controlled coupling 16 is placed in a fully engaged state in a short period of time, when returning to the "connected, four-wheel drive mode."

In Step S10, following the output of the engagement command of the electronically controlled coupling 16 in Step S9, the clutch differential rotation speed $\Delta N$, which is the differential rotation of the dog clutch 8, is calculated, and the process proceeds to Step S11. Here, the clutch differential rotation speed $\Delta N$ is calculated by subtracting the output rotational speed (calculated value based on the detection value of the ring gear rotational frequency) from the input rotational speed (average value of the left and right front wheel speeds) of the dog clutch 8.

In Step S11, following the calculation of the clutch differential rotation speed $\Delta N$ in Step S10, it is determined whether or not the clutch differential rotation speed $\Delta N$ is less than or equal to the rotation synchronization determination threshold value a. If YES ($\Delta N \leq \alpha$), the process proceeds to Step S12, and if NO ($\Delta N > \alpha$), the process returns to Step S9. Here, the rotation synchronization determination threshold value a is a clutch differential rotation speed value for determining a rotationally synchronized state in which the engagement of the dog clutch 8 is possible, and a fixed value may be given, or a variable value corresponding to the vehicle speed VSP, or the like, may be given.

In Step S12, following the determination that $\Delta N \leq \alpha$ in Step S11, or the determination that the dog clutch engagement is incomplete in Step S13, an engagement command is output to the clutch actuator 48 of the dog clutch 8, and the process proceeds to Step S13.

In Step S13, following the output of an engagement command to the dog clutch 8 in Step S12, it is determined whether or not the engagement of the dog clutch 8 is complete. If YES (dog clutch engagement complete), the process proceeds to RETURN, and if NO (clutch engagement incomplete), the process returns to Step S12. Here, whether or not the engagement of the dog clutch 8 is complete is carried out on the basis of stroke information from the dog clutch stroke sensor 53. In addition, when the process proceeds to RETURN, the mode is henceforth considered to be in the "connected, four-wheel drive mode."

Next, the actions are described. The "engagement/disengagement control action of the drive system clutch," the "drive mode switching control action by a brake operation," and the "other featured actions in the drive mode switching control" will be separately described, regarding the actions in the clutch control device for a four-wheel drive hybrid vehicle of the first embodiment.

Engagement/Disengagement Control Action of the Drive System Clutch

First, the flow of the engagement/disengagement control process of the drive system clutch (dog clutch 8, electronically controlled coupling 16) will be described, with reference to the flowchart of FIG. 5.

First, during low vehicle speed travel by accelerator depression where the "connected, four-wheel drive mode" is selected, the process proceeds to Step S1→Step S2→RETURN, in the flowchart of FIG. 5. That is, the "connected, four-wheel drive mode," in which both the dog clutch 8 and the electronically controlled coupling 16 are engaged, is maintained.

Next, during low vehicle speed coasting travel when the foot is lifted off the accelerator and the foot is lifted off the brake where the "connected, four-wheel drive mode" is selected, the process proceeds to Step S1→Step S2→Step S3→RETURN, in the flowchart of FIG. 5. That is, the "connected, four-wheel drive mode," in which both the dog clutch 8 and the electronically controlled coupling 16 are engaged, is maintained.

Next, during low vehicle speed coasting travel when the foot is lifted off the accelerator when the "connected, four-wheel drive mode" is selected, the process proceeds to Step S1→Step S2→Step S3→Step S4-Step S5, in the flowchart of FIG. 5. For example, when the operating point moves from point L to point N via point M (at the time of a brake depression operation) in FIG. 3, in Step S4, if there is a brake depression operation, a disengagement command is immediately output to the coupling actuator 49 of the electronically controlled coupling 16. In the following Step S5, it is determined whether or not the disengagement of the electronically controlled coupling 16 is complete, and while it is determined that the disengagement of the electronically controlled coupling 16 is incomplete, the flow that proceeds to Step S4→Step S5 is repeated. When it is determined that the disengagement of the electronically controlled coupling 16 is complete in Step S5, the process proceeds from Step S5 to Step S6→Step S7. In Step S6, when the disengagement of the electronically controlled coupling 16 is completed, a disengagement command is immediately output to the clutch actuator 48 of the dog clutch 8. In the next Step S7, it is determined whether or not the disengagement of the dog clutch 8 is complete, and while it is determined that the disengagement of the dog clutch 8 is incomplete, the flow that proceeds to Step S6→Step S7 is repeated. When it is determined that the disengagement of the dog clutch 8 is complete in Step S7, the process proceeds from Step S7 to RETURN. In this manner, when a brake depression operation is carried out during low vehicle speed coasting travel, the mode is switched from the "connected, four-wheel drive mode" to the "disconnected, two-wheel drive mode," even though the operating point is present in the "connected, four-wheel drive mode."

Then, after switching to the "disconnected, two-wheel drive mode," while the brake depression operation is maintained, the flow that proceeds to Step S1→Step S8→RETURN is repeated, in the flowchart of FIG. 5.

Thereafter, if the foot is lifted off the brake pedal, the process proceeds from Step S8 to Step S9→Step S10→Step S11. That is, if it is determined that the foot is lifted off the brake in Step S8, an engagement command is immediately output to the coupling actuator 49 of the electronically controlled coupling 16 in Step S9. In Step S10, the clutch differential rotation speed ΔN, which is the differential rotation of the dog clutch 8, is calculated, and in Step S11, it is determined whether or not the clutch differential rotation speed ΔN is less than or equal to the rotation synchronization determination threshold value a. Then, while it is determined that ΔN>α in Step S11, the flow that proceeds to Step S9→S10→S11 is repeated. Then, when the rotation synchronization determination condition is satisfied in Step S11, the process proceeds from Step S11 to S12→Step S13, and in Step S12, an engagement command is output to the clutch actuator 48 of the dog clutch 8. In the next Step S13, it is determined whether or not the engagement of the dog clutch 8 is complete, and while it is determined that the clutch engagement is incomplete, the flow that proceeds to Step S12→Step S13 is repeated. When it is determined that the engagement of the dog clutch 8 is complete in Step S13, the process proceeds from Step S13 to RETURN. In this manner, when the foot is lifted off the brake after switching to the "disconnected, two-wheel drive mode," the mode is switched back from the "disconnected, two-wheel drive mode" to the "connected, four-wheel drive mode."

Figure 6:
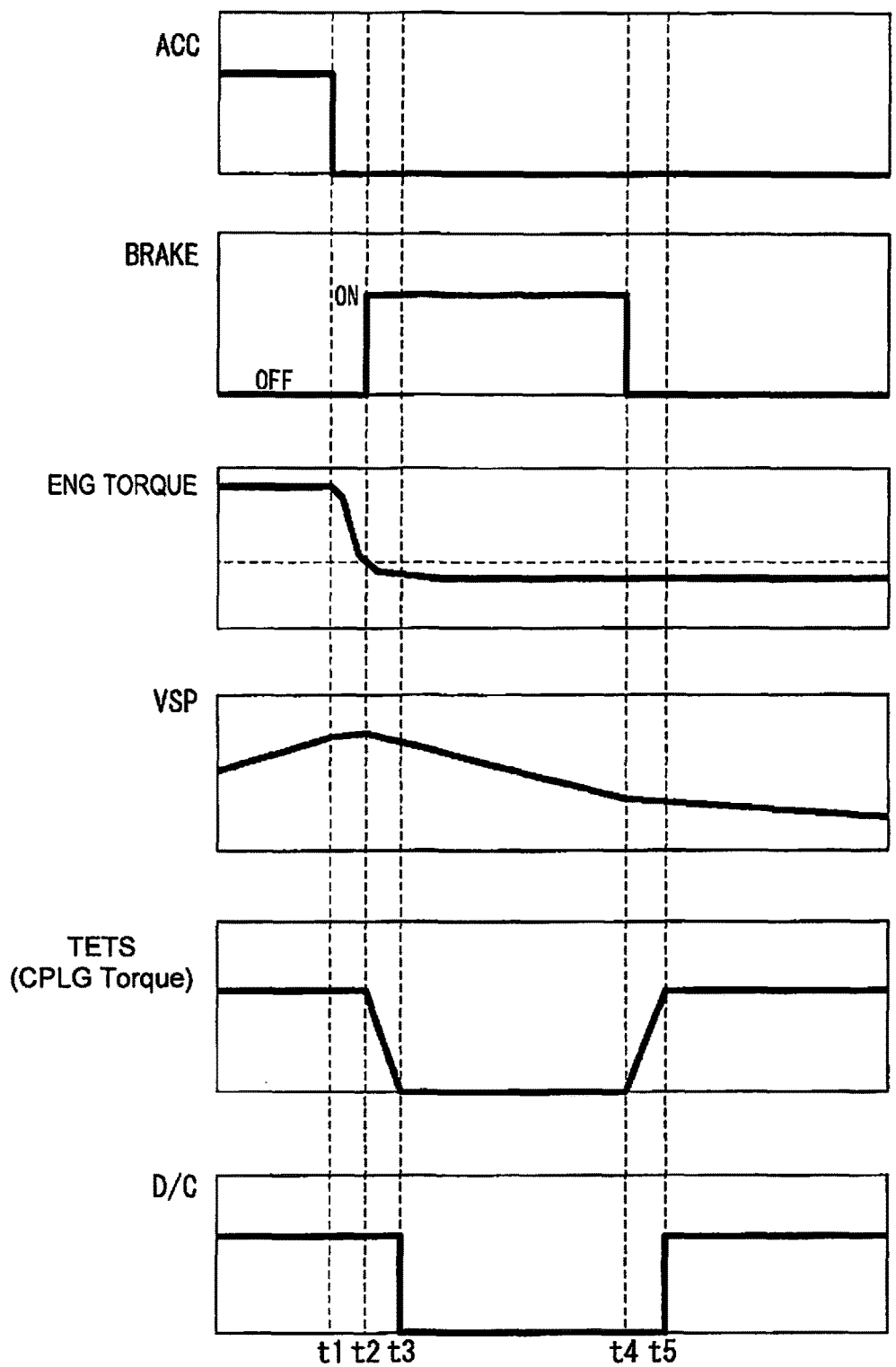
FIG. 6 is a time chart illustrating each of the features: accelerator position opening amount (ACC)/brake operating state/engine torque/vehicle speed (VSP)/coupling transmission torque (TETS)/dog clutch engagement/disengagement states, when a brake depression operation is temporarily carried out during coasting travel of the "connected, four-wheel drive mode."

Next, the engagement/disengagement control action of the dog clutch 8 and the electronically controlled coupling 16 when a brake depression operation is temporarily carried out during coasting travel in the "connected, four-wheel drive mode" will be explained on the basis of time chart of FIG. 6. When the accelerator position opening amount ACC is rapidly decreased at time t1, the engine torque starts to decrease from time t1, and the increase gradient of the vehicle speed VSP is reduced. Then, when a brake depression operation is carried out at time t2, the disengagement of the electronically controlled coupling 16 is started at the timing of time t2, and the vehicle speed VSP shifts to a decreasing gradient. Then, when the disengagement of the electronically controlled coupling 16 is completed at time t3, the engagement of the dog clutch 8 is disengaged. With this disengagement of the dog clutch 8, a rear wheel drive power transmission system on the downstream side of the dog clutch 8 is disconnected from a front wheel drive power transmission system and placed into the "disconnected, two-wheel drive mode."

The "disconnected, two-wheel drive mode" is maintained from time t3 to time t4 during which time the brake depression operation is continued. Then, when the foot is lifted off the brake at time t4, the engagement of the electronically controlled coupling 16 is started at the timing of time t4, and the stopped propeller shaft 12 starts to rotate. Accordingly, the clutch differential rotation speed ΔN of the dog clutch 8 starts to fall, and when it is determined that the clutch differential rotation speed ΔN is in synchronous rotation at time t5, the dog clutch 8 is engaged. With this engagement of the dog clutch 8, the front wheel drive power transmission system and the rear wheel drive power transmission system are connected by the dog clutch 8, and the mode is switched from the "disconnected, two-wheel drive mode" to the "connected, four-wheel drive mode."

In this manner, when a brake depression operation is carried out during a low vehicle speed coasting travel at time t2, the mode is switched from the "connected, four-wheel drive mode" to the "disconnected, two-wheel drive mode" at time t3, even though the operating point is present in the "connected, four-wheel drive mode." Then, when the foot is lifted off the brake at time t4 after switching to the "disconnected, two-wheel drive mode," the mode is switched back from the "disconnected, two-wheel drive mode" to the "connected, four-wheel drive mode" at time t5.

Drive Mode Switching Control Action by a Braking Operation

The "connected, four-wheel drive mode," the "disconnected, two-wheel drive mode," and the "standby two-wheel drive mode" set regions that are selected by the vehicle speed VSP and the accelerator position opening amount ACC, as illustrated in FIG. 3. In particular, the "connected, four-wheel drive mode" is selected regardless of the magnitude of the accelerator position opening amount ACC, when the vehicle speed VSP is in a low-speed region.

Consequently, if the "connected, four-wheel drive mode" is selected in preparation for re-acceleration when the foot is lifted off the accelerator in a low-speed region, the "connected, four-wheel drive mode" is maintained whether or not the brakes are depressed. Therefore, when the brakes are depressed, the friction of the rear wheel drive power transmission system is increased. In particular, in the case of a four-wheel drive hybrid vehicle, regenerative control is carried out when the brakes are depressed, but since the friction of the drive system is high, the regenerative efficiency is impaired, and the regeneration amount is reduced by an amount corresponding to the friction loss.

On the other hand, if the foot is lifted off the accelerator when the "connected, four-wheel drive mode" is selected in a low-speed region, the mode will be switched to the "disconnected, two-wheel drive mode," whether or not the brakes are depressed. In this case, if the brakes are depressed, the friction of the rear wheel drive power transmission system is reduced. However, since the mode is switched to the "disconnected, two-wheel drive mode" while the brakes are not depressed, the acceleration requirement cannot be met during re-acceleration when shifting from when the foot is lifted off the accelerator to an accelerator depression operation, so that there is the concern of the four-wheel drive performance being negatively impacted.

In contrast, in the first embodiment, when the foot is lifted off the accelerator in a low-speed region when the "connected, four-wheel drive mode" is selected, the "connected, four-wheel drive mode" is maintained while the brakes are not depressed. On the other hand, the embodiment is configured to shift from the "connected, four-wheel drive mode" to the "disconnected, two-wheel drive mode" when the brakes are depressed.

Therefore, the "connected, four-wheel drive mode" is a high drive performance four-wheel drive mode that allocates the drive force from the drive source to the four wheels at the time of an acceleration request and the like. The "disconnected, two-wheel drive mode" is a two-wheel drive mode that suppresses friction loss and the like by stopping the rotation of the rear wheel drive power transmission system to the left and right rear wheels 19 and 20 from the dog clutch 8 to the electronically controlled coupling 16.

In contrast, when the foot is lifted off the accelerator and the brakes are not operated, it is necessary to prepare for re-acceleration by a depression of the accelerator immediately thereafter. However, it was recognized that when the brakes are depressed, the operating procedure will be such that the accelerator is depressed after the foot is lifted off the brake, so that there is less need to prepare for re-acceleration compared to while the brakes are not depressed.

In light of this recognition, since the "connected, four-wheel drive mode" is maintained if the brakes are not depressed, the acceleration requirement can be met during re-acceleration when shifting from when the foot is lifted off the accelerator to an accelerator depression operation, thereby ensuring four-wheel drive performance. On the other hand, since the mode is switched from the "connected, four-wheel drive mode" to the "disconnected, two-wheel drive mode" when the brakes are depressed, friction in the rear wheel drive power transmission system is reduced during braking. As a result, it is possible to achieve a balance between ensuring four-wheel drive performance during re-acceleration and reducing friction in the rear wheel drive power transmission system during braking when the foot is lifted off the accelerator in a low-speed region when the "connected, four-wheel drive mode" has been selected.

Other Featured Actions in the Drive Mode Switching Control

In the first embodiment, the drive source is configured to comprise a motor/generator 27 that carries out regenerative control during a brake depression operation. That is, if the brakes are depressed when the foot is lifted off the accelerator in a low-speed region when the "connected, four-wheel drive mode" has been selected, the mode is shifted to the "disconnected, two-wheel drive mode," and the friction in the rear wheel drive power transmission system is reduced, as described above. On the other hand, during braking deceleration by a brake operation, regenerative control is carried out in which the energy that is input from the left and right front wheels 6 and 7 is passed through only the front wheel drive system and converted into electrical energy by the motor/generator 27. Therefore, during a braking operation, the friction received from the rear wheel drive power transmission system is reduced, and the amount of regeneration can thereby be increased in proportion to the reduction in friction. Therefore, if the brakes are depressed when the foot is lifted off the accelerator in a low-speed region where the "connected, four-wheel drive mode" is selected, the amount of regeneration can thereby be increased in proportion to the reduction in friction.

The first embodiment is configured so that if a shift from the "connected, four-wheel drive mode" to the "disconnected, two-wheel drive mode" is determined by a brake depression operation, control is carried out in which a disengagement request is issued to the dog clutch 8, and the dog clutch 8, which is in an engaged state, is disengaged after the electronically controlled coupling 16 is disengaged. That is, during disengagement of the dog clutch 8, if the dog clutch 8 is attempted to be disengaged while keeping the electronically controlled coupling 16 engaged, the load of the rear wheel drive system is applied to the output side of the dog clutch 8. Consequently, the dog clutch 8, which is in a state of being applied the engagement load, will be forcibly disengaged; therefore, it becomes necessary to exert an operating force that exceeds the load as the clutch actuator, and the time required for completing the disengagement of the dog clutch 8 will also increase. In contrast, during disengagement of the dog clutch 8, by first disengaging the electronically controlled coupling 16 and then disengaging the dog clutch 8, the engagement load of the dog clutch 8 is reduced, and it becomes possible to complete the disengagement of the dog clutch 8 in a short period of time from a brake depression operation, with good responsiveness.

In the first embodiment, if the foot is lifted off the brake after shifting to the "disconnected, two-wheel drive mode" by a brake depression operation, an engagement request is issued to the dog clutch 8. Then, control is carried out, in which, after the output rotation of the dog clutch 8 is increased and the dog clutch is placed in a rotationally synchronized state by engaging the electronically controlled coupling 16, the dog clutch 8, which was in a disengaged state, is now engaged. That is, since the dog clutch 8, unlike the electronically controlled coupling 16, which is a friction clutch, is a dog clutch, it is necessary to place the clutch input rotation and the clutch output rotation in a synchronized state upon engagement. In contrast, if the foot is lifted off the brake, a rotationally synchronized state can be attained with good responsiveness, by increasing the output rotation of the dog clutch 8 by immediately engaging the electronically controlled coupling 16. Therefore, when engaging the dog clutch 8, by first engaging the electronically controlled coupling 16 and then engaging the dog clutch 8, a rotationally synchronized state of the dog clutch 8 can be attained with good responsiveness; it thus becomes possible to complete the engagement of the dog clutch 8 in a short period of time after the foot is lifted off the brake, with good responsiveness.

In the first embodiment, the dog clutch 8 is disposed in an upstream position of the output pinion 10 and the bevel gear 9 provided at a drive branch position to the left and right front wheels 6 and 7. The electronically controlled coupling 16 is configured to be disposed in the left rear wheel drive shaft 17 position of the left rear wheel 19, and extends from the bevel gear 9 and the output pinion 10 through the rear wheel output shaft 11, the propeller shaft 12 and the drive pinion 13, the ring gear 14, and the rear differential 15. With this configuration, when the "disconnected, two-wheel drive mode" is selected, the rotation of the bevel gear 9, the output pinion 10, the rear wheel output shaft 11, the propeller shaft 12, the drive pinion 13, the ring gear 14, and the differential case of the rear differential 15, is stopped. Therefore, when the "disconnected, two-wheel drive mode" is selected, an action is undertaken to stop the rotation of the drive system from the dog clutch 8 to the electronically controlled coupling 16, so that it is possible to effectively suppress friction loss and oil stirring loss, and to achieve an improvement in fuel efficiency and electrical efficiency.

Next, the effects are described. The effects listed below can be obtained with the clutch control device for a four-wheel drive hybrid vehicle according to the first embodiment.

(1) In a four-wheel drive vehicle in which, of the left and right front wheels 6 and 7 and the left and right rear wheels 19 and 20, one pair is set as the main drive wheels which are connected to a drive source (transverse engine 1) and the other pair is set as the auxiliary drive wheels which are connected to the drive source (transverse engine 1) via a clutch, and which comprises a plurality of clutches, that is, a dog clutch (dog clutch 8) and a friction clutch (electronically controlled coupling 16), which are respectively disposed separately in a drive branch-side transmission system path and in an auxiliary drive wheel-side transmission system path that sandwich a differential (rear differential 15), of a system for transmitting drive force to the auxiliary drive wheels (left and right rear wheels 19 and 20), where the dog clutch (dog clutch 8) separates the system for transmitting drive force to the auxiliary drive wheels (left and right rear wheels 19 and 20) from the system for transmitting drive force to the main drive wheels (left and right front wheels 6 and 7) by releasing the clutch, and the friction clutch (electronically controlled coupling 16) allocates a portion of the drive force from the drive source (transverse engine 1) to the auxiliary drive wheels (left and right rear wheels 19 and 20) in accordance with the clutch engagement capacity, and a clutch controller (4WD control unit 34, FIG. 5) that carries out an engagement and disengagement control of the dog clutch (dog clutch 8) and an engagement and disengagement control of the friction clutch (electronically controlled coupling 16), where the four-wheel drive vehicle (four-wheel drive hybrid vehicle) includes a "disconnected, two-wheel drive mode" in which the dog clutch (dog clutch 8) and the friction clutch (electronically controlled coupling 16) are disengaged, and a "connected, four-wheel drive mode" in which the dog clutch (dog clutch 8) and the friction clutch (electronically controlled coupling 16) are engaged, wherein when the foot is lifted off the accelerator in a low-speed region where the "connected, four-wheel drive mode" is selected, the clutch controller (4WD control unit 34, FIG. 5) maintains the "connected, four-wheel drive mode" when the brake is not depressed, and shifts to the "disconnected, two-wheel drive mode" when the brakes are depressed (FIG. 5). Accordingly, it is possible to achieve a balance between securing four-wheel drive performance during re-acceleration and reducing friction in a drive transmission system during braking when the foot is lifted off the accelerator in a low-speed region where the "connected, four-wheel drive mode" has been selected.

(2) The drive source comprises a motor/generator 27 that carries out regenerative control during a brake depression operation (FIG. 1). Accordingly, in addition to the effect of (1), if the brake is depressed when the foot is lifted off the accelerator in a low-speed region where the "connected, four-wheel drive mode" is selected, and the amount of regeneration can thereby be increased in proportion to the reduction in friction.

(3) If a shift from the "connected, four-wheel drive mode" to the "disconnected, two-wheel drive mode" is determined by a brake depression operation, the clutch controller (4WD control unit 34, FIG. 5) carries out a control in which a disengagement request is issued to the dog clutch (dog clutch 8), and the dog clutch (dog clutch 8), which is in an engaged state, is disengaged after the friction clutch (electronically controlled coupling 16) is disengaged (FIG. 5, S3-S7). Accordingly, in addition to the effect of (1) or (2), the engagement load of the dog clutch (dog clutch 8) is reduced, and it becomes possible to complete the disengagement of the dog clutch (dog clutch 8) in a short period of time from a brake depression operation, with good responsiveness.

(4) If the foot is lifted off the brake after shifting to the "disconnected, two-wheel drive mode" by a brake depression operation, the clutch controller (4WD control unit 34, FIG. 5) carries out a control in which an engagement request is issued to the dog clutch (dog clutch 8), and the dog clutch (dog clutch 8), which is in a disengaged state, is engaged after the dog clutch (dog clutch 8) is put in a rotationally synchronized state by engaging the friction clutch (electronically controlled coupling 16) (FIG. 5, S8-S13). Accordingly, in addition to the effect of (3), a rotationally synchronized state of the dog clutch (dog clutch 8) can be attained with good responsiveness, and it becomes possible to complete the engagement of the dog clutch (dog clutch 8) in a short period of time after the foot is lifted off the brake, with good responsiveness.

(5) The dog clutch (dog clutch 8) is disposed in an upstream position of a transfer mechanism (bevel gear 9, output pinion 10) provided at a drive branch position to the auxiliary drive wheels (left and right rear wheels 19 and 20), and the friction clutch (electronically controlled coupling 16) is disposed in the drive shaft (left rear wheel drive shaft 17) position of the auxiliary drive wheel (left rear wheel 19), which traverses from the transfer mechanism (bevel gear 9, output pinion 10) to the propeller shaft 12 and the differential (rear differential 15) (FIG. 1). Accordingly, in addition to the effects of (1)-(4), in a front wheel drive based four-wheel drive vehicle, when the "disconnected, two-wheel drive mode" is selected, it is possible to effectively suppress friction loss and oil stirring loss, to achieve an improvement in fuel efficiency and electric efficiency.

Second Embodiment

The second embodiment is an example in which the clutch control device is applied to a rear wheel drive based four-wheel drive vehicle, and the positional relationship of the dog clutch and the friction clutch that sandwich the differential is reversed from the positional relationship thereof in the first embodiment.

Figure 7:
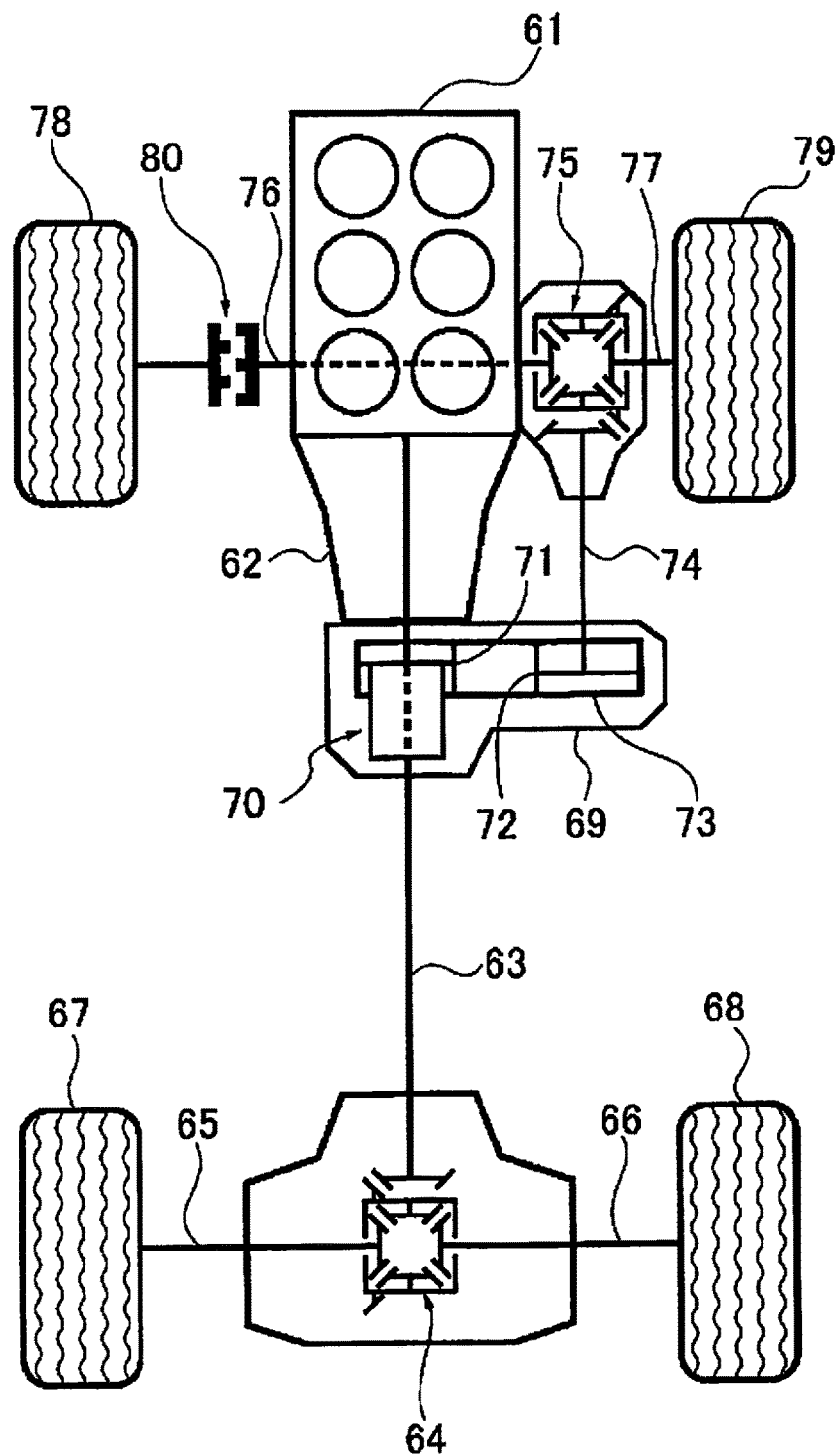
FIG. 7 is a block view of the drive system illustrating the configuration of the drive system of a front wheel drive based four-wheel drive vehicle to which is applied the clutch control device of the second embodiment.

FIG. 7 illustrates the configuration of the drive system of a rear wheel drive based four-wheel drive vehicle to which is applied the clutch control device. The drive system configuration of the four-wheel drive vehicle will be described below based on FIG. 7.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel), as illustrated in FIG. 7. That is, the drive force that has passed through the transverse engine 61 and the transmission 62 is transmitted to the left and right rear wheel drive shafts 65, 66 via the rear propeller shaft 63 and the rear differential 64, and constantly drives the left and right rear wheels 67 and 68 while allowing a differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73, as illustrated in FIG. 7. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in an upstream position of the input side sprocket 71 (main drive system side position).

A dog clutch 80 (dog clutch) is disposed in an intermediate position of the left front wheel drive shaft 76, which connects the front differential 75 and the left front wheel 78. That is, the drive system is configured to be capable of selecting a two-wheel drive mode (i.e., disconnected, two-wheel drive mode) in which both the electronically controlled coupling 70 and the dog clutch 80 are disengaged. The rotation of the drive system (rotation of the front propeller shaft 74, etc.) on the downstream side of the electronically controlled coupling 70 is stopped by releasing these electronically controlled coupling 70 and dog clutch 80; it is thereby possible to suppress friction loss and oil stirring loss so that improved fuel efficiency can be realized.

Next, the synchronous operation of the dog clutch 80 will be described. The first embodiment is configured so that the dog clutch 8 is disposed on the drive branch-side transmission system path and the electronically controlled coupling 16 is disposed on the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8, which is in a disengaged state, and an engagement control of the electronically controlled coupling 16 is carried out, the left side gear of the rear differential 15 is restricted by the rotational frequency of the left rear wheel 19. Therefore, of the rotational frequencies of the three rotating members of the rear differential 15 (the left and right side gears and the differential case), the rotational frequency of the propeller shaft 12, which is connected to the differential case, becomes the average rotational frequency of the left and right rear wheels 19 and 20 (driven wheel rotational frequency), since the rotational frequencies of the left and right side gears are restricted. As a result, when the left and right front wheels 6 and 7 are in a non-slip state, the clutch differential rotation speed ΔN of the dog clutch 8 becomes ΔN=0. However, when the left and right front wheels 6 and 7 are in a slip state, the clutch differential rotation speed ΔN which has been decreasing with time will reach a limit at a certain differential rotation; thereafter, the clutch differential rotation speed ΔN shifts to an increase, and the clutch differential rotation speed ΔN is increased with time.

In contrast, the second embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63. Therefore, of the rotational frequencies of the three rotating members of the front differential 75 (left and right side gears and the differential case), due to the rotational frequency of the right side gear (right front wheel 79) being restricted, the rotational frequency of the left side gear will be determined by two rotational frequencies. As a result, when the left and right rear wheels 67 and 68 are in a non-slip state, the clutch differential rotation speed ΔN of the dog clutch 80 becomes ΔN=0. However, when the left and right rear wheels 67 and 68 are in a slip state, the clutch differential rotation speed ΔN which has been decreasing with time will be reversed across ΔN=0 (zero); thereafter, the clutch differential rotation speed ΔN will be increased in a reversed state. The other actions are the same as the first embodiment, so the descriptions thereof are omitted.

Next, the effects are described. The following effects can be obtained with the clutch control device for a four-wheel drive vehicle according to the second embodiment.

(6) The friction clutch (electronically controlled coupling 70) is disposed in an upstream position of a transfer mechanism (input side sprocket 71, output side sprocket 72, chain 73) provided at a drive branch position to the auxiliary drive wheels (left and right front wheels 78, 79), and the dog clutch (dog clutch 80) is disposed in the drive shaft (left front wheel drive shaft 76) position of the auxiliary drive wheel (left front wheel 78), this drive shaft extending from the transfer mechanism to the propeller shaft (front propeller shaft) and the differential (front differential 75). Accordingly, in addition to the effects of (1)-(4) described above, in a rear wheel drive based four-wheel drive vehicle, when the "disconnected, two-wheel drive mode" is selected, it is possible to effectively suppress friction loss and oil stirring loss, so as to achieve an improvement in fuel efficiency.

The clutch control device for a four-wheel drive vehicle of the present invention was described above based on the first embodiment and the second embodiment, but specific configurations thereof are not limited to these embodiments, and various modifications and additions to the design can be made without departing from the scope of the invention according to each claim in the Claims section.

In the first embodiment, an example was shown in which a "disconnected, two-wheel drive mode," a "connected, four-wheel drive mode," and a "standby two-wheel drive mode" are provided as drive modes. However, the drive modes may comprise only the "disconnected, two-wheel drive mode" and the "connected, four-wheel drive mode."

In the first embodiment, an example was shown in which a dog clutch 8 is disposed in an upstream position of the transfer mechanism as a dog clutch. However, a dog clutch may be disposed in a downstream position of the transfer mechanism, in the propeller shaft position, as the dog clutch.

In the first embodiment, an example was shown in which an electronically controlled coupling 16 is disposed in an intermediate position of the left rear wheel drive shaft 17 as the friction clutch. However, an electronically controlled coupling may be disposed in an intermediate position of the right rear wheel drive shaft as the friction clutch.

In the first embodiment, an example was shown in which the clutch control device of the present invention is applied to a front wheel drive based four-wheel drive hybrid vehicle, in which an engine and a motor/generator are mounted as drive sources. In the second embodiment, an example was shown in which the clutch control device of the present invention is applied to a rear wheel drive based four-wheel drive vehicle (4WD engine vehicle), in which the left and right rear wheels are the main drive wheels. However, the clutch control device may be applied to a rear wheel drive based four-wheel drive vehicle in which the positional relationship of the dog clutch and the friction clutch is set with the same relationship as in the first embodiment. In addition, the clutch control device may be applied to a front wheel drive based four-wheel drive vehicle in which the positional relationship of the dog clutch and the friction clutch is set with the same relationship as in the second embodiment. Additionally, the clutch control device can of course be applied to other vehicles besides a 4WD engine vehicle, such as a 4WD hybrid vehicle in which an engine and an electric motor are mounted as drive sources, or a 4WD electric vehicle in which a motor/generator is mounted as the drive source.

The invention claimed is:

1. A clutch control device for a four-wheel drive vehicle having a pair of main drive wheels and a pair of auxiliary drive wheels which are selectively connected to the drive source, the clutch control device comprising:
    a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
    a friction clutch operatively disposed in a transmission path between the main drive wheels and the auxiliary drive wheels to allocate a portion of the drive force from the drive source to the auxiliary drive wheels in accordance with a clutch engagement capacity of the friction clutch; and
    a clutch controller operatively coupled to the dog clutch and the friction clutch to selectively carry out an engagement and disengagement control of the dog clutch and an engagement and disengagement control of the friction clutch,
    the clutch controller being programmed to selectively establish a disconnected, two-wheel drive mode in which the dog clutch and the friction clutch are disengaged, and a connected, four-wheel drive mode in which the dog clutch and the friction clutch are engaged, and
    the clutch controller, in response to a driver's foot being lifted off an accelerator while the connected, four-wheel drive mode is selected, being programmed to maintain the connected, four-wheel drive mode while brakes are not depressed, and to shift to the disconnected, two-wheel drive mode when the brakes are depressed.

2. The clutch control device as recited in claim 1, wherein the drive source comprises a motor/generator that carries out regenerative control during a brake depression operation.

3. The clutch control device according to claim 2, wherein the clutch controller is further programmed to carry out a control in which a disengagement request is issued to the dog clutch such that the dog clutch, which is in an engaged state, is disengaged after the friction clutch is disengaged upon determining the connected, four-wheel drive mode has been shifted to the disconnected, two-wheel drive mode based on a brake depression operation.

4. The clutch control device according to claim 2, wherein the clutch controller is further programmed to carry out a control in which an engagement request is issued to the dog clutch such that the dog clutch, which is in a disengaged state, is engaged after the dog clutch is placed in a rotationally synchronized state by engaging the friction clutch upon determining the driver's foot has been lifted off the brake after shifting to the disconnected, two-wheel drive mode due to a brake depression operation.

5. The clutch control device according to claim 2, wherein the dog clutch is disposed upstream of a transfer mechanism provided at a drive branch position to the auxiliary drive wheels, and
    the friction clutch is disposed in a drive shaft of one of the auxiliary drive wheels which extends from the transfer mechanism that is connected to a propeller shaft and a differential.

6. The clutch control device according to claim 2, wherein the friction clutch is disposed upstream of a transfer mechanism provided at a drive branch position to the auxiliary drive wheels, and
    the dog clutch is disposed in a drive shaft of one of the auxiliary drive wheels which extends from the transfer mechanism that is connected to a propeller shaft and a differential.

7. The clutch control device as recited in claim 1 wherein the clutch controller is further programmed to carry out a control in which a disengagement request is issued to the dog clutch such that the dog clutch, which is in an engaged state, is disengaged after the friction clutch is disengaged upon determining the connected, four-wheel drive mode has been shifted to the disconnected, two-wheel drive mode based on a brake depression operation.

8. The clutch control device according to claim 7, wherein the clutch controller is further programmed to carry out a control in which an engagement request is issued to the dog clutch such that the dog clutch, which is in a disengaged state, is engaged after the dog clutch is placed in a rotationally synchronized state by engaging the friction clutch upon determining the driver's foot has been lifted off the brake after shifting to the disconnected, two-wheel drive mode due to a brake depression operation.

9. The clutch control device according to claim 7, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

10. The clutch control device according to claim 7, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

11. The clutch control device as recited in claim 1, wherein
the clutch controller is further programmed to carry out a control in which an engagement request is issued to the dog clutch such that the dog clutch, which is in a disengaged state, is engaged after the dog clutch is placed in a rotationally synchronized state by engaging the friction clutch upon determining the driver's foot has been lifted off the brake after shifting to the disconnected, two-wheel drive mode due to a brake depression operation.

12. The clutch control device according to claim 11, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

13. The clutch control device according to claim 11, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

14. The clutch control device as recited in claim 1, wherein
the dog clutch is disposed upstream of a transfer mechanism provided at a drive branch position to the auxiliary drive wheels, and
the friction clutch is disposed in a drive shaft of one of the auxiliary drive wheels which extends from the transfer mechanism that is connected to a propeller shaft and a differential.

15. The clutch control device as recited in claim 1, wherein
the friction clutch is disposed upstream of a transfer mechanism provided at a drive branch position to the auxiliary drive wheels, and
the dog clutch is disposed in a drive shaft of one of the auxiliary drive wheels which extends from the transfer mechanism that is connected to a propeller shaft and a differential.

* * * * *